June 13, 1961
S. VAJNA
2,988,463
METHOD OF PURIFYING SUGAR SOLUTIONS
Filed March 20, 1958
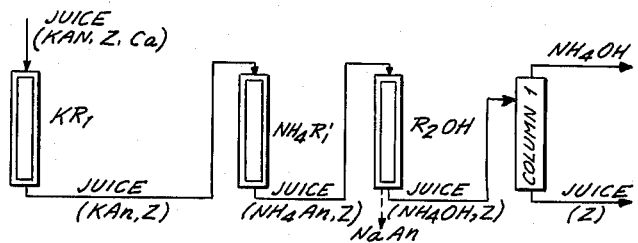
FIG. 1
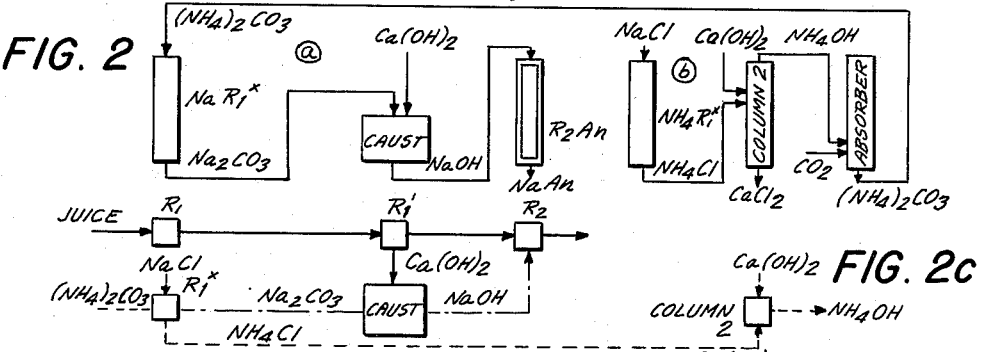
FIG. 2
FIG. 2c
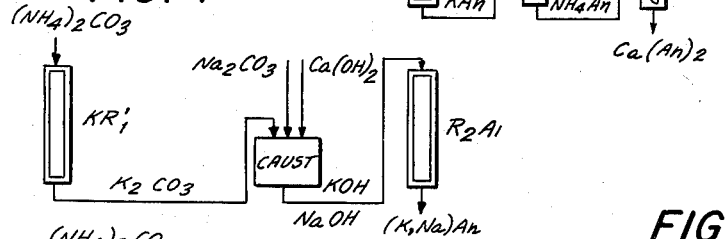
FIG. 3
FIG. 4
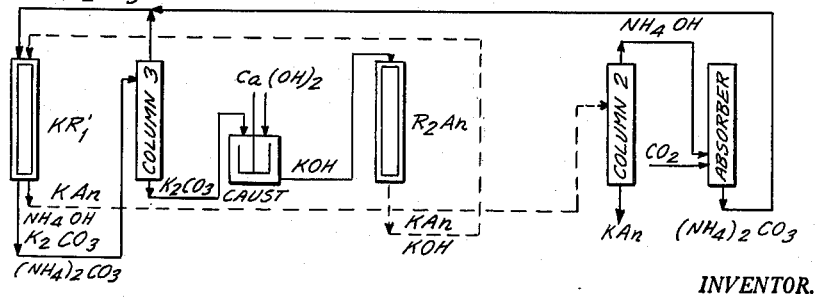
FIG. 5
INVENTOR.
Sandor Vajna
BY
Michael S. Striker
Attorney

| United States Patent Office | 2,988,463
Patented June 13, 1961 |

2,988,463
METHOD OF PURIFYING SUGAR SOLUTIONS
Sandor Vajna, Haselbergstrasse 4, Koln, Germany
Filed Mar. 20, 1958, Ser. No. 722,796
Claims priority, application Germany Mar. 21, 1957
12 Claims. (Cl. 127—46)

The present invention relates to a method of purifying sugar-containing solutions and, more particularly, the present invention relates to a method according to which sugar-containing solutions can be purified by ion exchange in an economical and relatively simple manner.

It has been known for quite some time to use ion exchangers in sugar mills for the removal of salts from sugar-containing solutions in order to increase the sugar yield. The non-sugar constituents which in this manner are removed from sugar-containing solutions and which are retained in the ion exchangers are removed therefrom by passing a regenerating solution through the ion exchanger. In order to utilize the thus-separated non-sugar constituents, for instance as cattle feed, it is necessary to remove the same from the spent regenerating solution by additional chemical treatment. The additional costs involved therein frequently make the recovery of the non-sugar constituents of doubtful economic value.

According to one of these methods, the ionized non-sugar substances are first transformed in ion exchangers into ammonium hydroxide which then can be removed from the solution by evaporation. For the regeneration of the cation exchanger used in this process, it is generally possible to use any desired ammonium salt, however, it is particularly advantageous to use ammonium carbonate since in this case the anion consists of carbonic acid which is available in all sugar mills particularly in beet sugar mills.

The above process can be schematically described in the following three equations:

(1) $KAn + NH_4R_1 = NH_4An + KR_1$
(2) $NH_4An + R_2OH = NH_4OH + R_2An$
(3) $Sugar \cdot NH_4OH = NH_4OH + Sugar$ In the above equations "K" denotes the alkali metal cations, "An" the various anions, "$R_1$" the cation exchanger and "$R_2$" the anion exchanger. In order to be capable of splitting the ammonium salts, $R_2$ has to be strongly basic.

It is an object of the present invention to provide a method for the purification of sugar-containing solutions which can be carried out in a simple manner and more economically as was heretofore possible.

Other objects and advantages of the present invention will become apparent from a further reading of the description and of the appended claims.

With the above and other objects in view, the present invention mainly comprises in a method of purifying sugar-containing solution to ion exchange in a cation exchanger in which alkali cations contained in the solution are removed therefrom in exchange for ammonium ions, regenerating the cation exchanger so as to form a solution of an alkali metal carbonate, subjecting the sugar and ammonium ions containing solution formed in the cation exchanger to ion exchange in a strongly basic anion exchanger, transforming the solution of alkali metal carbonate formed by regeneration of the cation exchanger into a solution of alkali metal hydroxide, regenerating the strongly basic anion exchanger with the thus-formed solution of alkali metal hydroxide, and subjecting additional sugar-containing solution to anion exchange in the thus-regenerated anion exchanger.

As will be described in detail further below, cation exchanger $R_1$ is to be regenerated with ammonium carbonate. Consequently, it is necessary to remove from the sugar-containing solution all salts of alkaline-earth metals prior to passing the sugar-containing solution through cation exchanger $R_1$, since otherwise in the presence of ammonium carbonate precipitation of alkaline-earth metal carbonates would occur. Thus, the solution, prior to being introduced into the cation exchanger, has to be softened. Accordingly, the sugar-containing solution prior to being introduced into $R_1$ has to pass through another cation exchanger which may be any conventional cation exchanger and which, for instance, may contain the same exchange resin as $R_1$.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1–5 schematically illustrate the process of the present invention.

Referring now to the drawings and particularly to FIG. 1 which basically illustrates the above-discussed process of the prior art, it should be noted that the exchanger columns are indicated by double line rectangles and the distilling columns by single line rectangles. $R_1$ is the cation exchanger used for softening the solution, $R_1'$ is the ammonium exchanger and $R_2$ is the anion exchanger. The solution containing sugar (Z), alkali metal ions (K), hardness causing ions (Ca), various anions (An) and undisclosed organic compounds, is first softened. Thereby, the hardness causing cations are exchanged with alkali metal ions. Thereafter, the alkali metal ions are exchanged with ammonium ions, and finally, the anions are replaced with OH-ions. The ammonium hydroxide is blown off in the distilling column, and the thus-purified solution which now contains besides sugar only undissociated organic compounds, is then further worked up.

Due to the fact that $R_2$, due to the strongly basic character, can only be regenerated with strongly basic hydroxides, the economy of the process is impaired. In order to avoid the economic disadvantages of the above-described process, it has been attempted to carry out the regeneration of the anion exchanger in two steps, namely with ammonium carbonate in the first step and with alkali metal hydroxides or ammonium hydroxide in the second step. In one case, the alkali metal hydroxide is transformed to the corresponding carbonate which then can be reconverted into the hydroxide with calcium oxide, while in the order case ammonium carbonate is formed which can be used for the first regeneration step. In this manner, it was possible to reduce the regeneration expense.

Since it is possible to free ammonia from the ammonium-containing solution obtained in the first regeneration step by treatment with lime and boiling out of the thus-freed ammonia, it is possible in this manner to add only lime and carbon dioxide to the regeneration process while recycling the ammonia. Basically, the same can be done with respect to the alkali metal hydroxide.

While the last-described process can be carried out in a more economical manner than the process described further above, it still has the disadvantage that regeneration of the strongly basic anion exchanger will run smoothly only if ammonium carbonate and ammonium hydroxide are applied in great excess.

Surprisingly, it has now been found that the regeneration of the anion exchanger can be carried out in a much more economical manner and high activity of the exchanger can be achieved with relatively small quantities of chemical reagents, if for the regeneration the hydroxide is used which during the process can be prepared by caustification of alkali metal carbonates formed by ion exchange. During the ion exchange, alkali metal carbonate solution of relatively great dilution is obtained which fact generally is considered a disadvantage in chemical operations. However, in the present case, it is necessary to employ a dilute solution so that the dilute hydroxide which is formed by ion exchange and caustification is directly usable.

The ion exchange leading to the formation of alkali metal carbonate can be carried out in known manner, using alkali metal salts which are transformed into alkali metal carbonate with the help of a cation exchanger.

The regeneration of $R_2$ according to the present invention is illustrated in FIG. 2, the individual portions of which are denoted as $a$, $b$ and $2c$. Portion $a$ of FIG. 2 shows preparation of the hydroxide required for regeneration of $R_2$ by means of an additional exchanger "$R_1^x$" preferably containing polystyrene-sulfo acid. Thereby, ammonium carbonate is passed through the cation exchanger which, for instance, contains Na-ions so that sodium carbonate is formed. The sodium carbonate is causticized with lime, freed of thereby formed calcium carbonate and used for regeneration of exchanger $R_2$ after the same has been exhausted by passing sugar-containing solution therethrough. Thereby, the hydroxide takes up the bound anions (NaAn). The right-hand portion $b$ of FIG. 2 shows the regeneration of the auxiliary exchanger. Exchanger $R_1^x$ which has been converted in the preceding operation into its ($NH_4$)-form, is thereby treated with sodium chloride solution, the thus-formed ammonium chloride is decomposed with lime in the distilling column and the thereby freed ammonia is withdrawn together with water vapors and is then condensed. In an absorber, the ammonia is then combined with carbon dioxide whereby ammonium carbonate is formed which again is used for the regeneration of $R_1^x$. A schematic plane view of the foregoing is shown in FIG. 2c.

It has been found to be particularly advantageous according to the present invention to use as starting material for the preparation of the alkali metal carbonate the waste solutions which accrue from the regeneration of strongly basic ion exchanger $R_2$ with alkali metal hydroxides (KAn). These waste solutions contain the entire alkali metal ions which were introduced in the form of their hydroxides and which can now be found after regeneration of the exchanger, bound to anions in the waste solutions.

With such solutions, it is possible to convert an ammonium ions- containing cation exchanger into the alkali metal form, in a manner similar to the previously suggested use of sodium chloride. Subsequent treatment with ammonium carbonate will yield an alkali metal carbonate solution. From the waste solution of the first regeneration, ammonia is recovered in known manner by boiling out with lime, and the thus-freed ammonia is then reacted with carbon dioxide to form ammonium carbonate.

FIG. 3 illustrates a modification of the present method which is essentially somewhat similar to what is shown in FIG. 2, FIG. 3 only illustrating the details which are different from what has been discussed above. The solution obtained in the regeneration of $R_2$ and which consists of the alkali metal salts of the various anions KaAn, is not drawn off but is used in place of sodium chloride for the regeneration of ammonium ions-containing cation exchanger $R_1^x$. Furthermore, according to FIG. 3 decomposition with lime will not result in the formation of calcium chloride, but instead in the formation of calcium salts of the various anions ($CaAn_2$).

However, it is also possible to use the alkali metal ions of the sugar-containing solutions as source for the needed alkali metal ions. These are transformed into carbonates in the manner described further above, since anyway ammonium carbonate is used for regenerating the cation exchanger. Thus, all that is required is to causticize the solutions accruing in the regeneration of the cation exchanger with lime.

By way of example, it is, for instance, possible to proceed as follows: The alkali metal carbonate solution which is obtained from the regeneration of the cation exchanger is first freed, by boiling, of excess ammonium carbonate. Thereafter, alkali metal carbonate is added in order to cover the loss of alkali metal ions and to assure the required excess of hydroxide for the regeneration of the anion exchanger. Subsequently, the solution is causticized by the addition thereto of burnt lime and thus transformed into alkali metal hydroxide.

The foregoing is illustrated in FIG. 4. Exchanger $R_1'$ will be charged with alkali metal ions by exchanging the alkali metal ions of the sugar-containing solution with ammonium ions as shown in FIG. 1. During regeneration, $R_1'$ is reconverted with ammonium carbonate into its original state. Due to this treatment, an alkali metal carbonate solution is obtained ($K_2CO_3$) which is causticized with lime in known manner. Since for the desired regeneration of anion exchanger $R_2$ an excess of regenerating hydroxides is required, this excess must be provided for instance by the addition of sodium carbonate which is simultaneously causticized. Thereby, the required excess of hydroxide is formed which is indicated with the separately written legend NaOH. The sodium carbonate required for this purpose can obviously also be obtained by a separately carried out ion exchange in an auxiliary exchanger such as illustrated in FIGS. 2 and 3.

For producing the above-mentioned excess of regenerating hydroxides it is also possible to use the alkali metal eration of the anion exchanger. From this waste solutions-containing waste solution accruing from the regeneration of the anion exchanger. From this waste solution alkali metal carbonate may either be produced in a separate cation exchanger, or the waste solution is recycled to the cation exchanger which is used for purification of the sugar-containing solution. However, in this case, a larger quantity of cation exchange resin must be used as is indicated in Equation 1.

FIG. 5 illustrates the last-discussed mode of operating the process of the present invention. Herein, $R_1'$ represents a larger quantity of the cation exchange resin as in the previous cases. Prior and after passing-through of the sugar-containing solution, the waste solution which is obtained by regenerating $R_2$ (which contains the alkali metal salts of the various anions (KAn) and the excess alkali metal hydroxide) is passed through exchanger $R_1'$ and takes up ammonium ions from the same. In order to indicate that this takes place prior to introduction of the ammonium carbonate, the foregoing is shown in FIG. 5 in dotted lines. The solution obtained by treatment of $R_1'$ with ammonium carbonate now contains a sufficient quantity of alkali metal carbonate in order to permit a preparation of the required excess of alkali metal hydroxide for the regeneration of $R_2$. Thereby, ammonium carbonate is retained in the solution (this was also the case in the previously discussed modifications of the present process but was not specifically mentioned in order to simplify the showing of the essential features of the process) which is driven off in distilling column 3. From distilling column 3, the alkali metal carbonate solution flows to the causticizer and is therein mixed with milk of lime. After removing the calcium carbonate formed thereby in a filtering device (not shown), the hydroxide is introduced into exchanger $R_2$. The solution formed in exchanger $R_2$ is then treated as described above. After exchange of the alkali metal ions for ammonium ions, the solution from $R_1'$ is passed to distilling column 2 and treated with milk of lime. The thereby formed ammonium hydroxide is driven off and combined with the ammonium hydroxide obtained from the sugar-containing solution (see FIG. 1). The combined solutions are treated in an absorber with carbon dioxide whereby the ammonium hydroxide is reconverted into ammonium carbonate which combined with the ammonium carbonate obtained from column 3 is then again used for regenerating $R_1$.

Furthermore, it has been found to be advantageous according to the present invention to pass the alkali metal salt solution which is used for forming the alkali metal carbonate through the exchanger after the sugar solution has been passed through the same. Thereby, on the one hand, the quantity and quality of the purified sugar solution is increased since the exchange capacity is only partially used by passing the sugar-containing solution through the exchanger, while on the other hand the ammonium carbonate solution used for regenerating the exchanger is better utilized.

As described above, the alkaline-earth constituents of the sugar-containing solution must be removed prior to the ammonium exchange, since the same would also be bound by the latter and would cause precipitation during the subsequent regeneration with ammonium carbonate. Removal of the alkaline-earth constituents is carried out in a preceding cation exchanger. Generally, sodium chloride solutions are used for the regeneration of such a softener. It has now been found that the alkali metal salt solutions which accrue in the treatment of the various ion exchangers can also be used for regeneration of the softener. Thereby, purchase of sodium chloride and the costs involved in making the sodium chloride solution are saved. For regeneration of the softener it is equally possible to use alkali metal salt solutions with or without ammonium ions.

In producing the excess quantities of hydroxides, the ion exchange is carried out by treating the ammonium ions-containing cation exchanger with alkali metal ions. The thus obtained solution contains ammonia. The ammonium hydroxide is liberated by adding lime and boiling, and is then reconverted into ammonium carbonate by reaction with carbon dioxide. It has now been found that it is possible to proceed without or with only a very small addition of lime. The spent regenerating solution leaving the anion exchanger contains the excess of hydroxides which is to be produced by the above process. In other words, the hydroxide excess of the spent regenerating solution from the anion exchanger is nearly or completely the equivalent of the above-mentioned ammonium ions. The thus available hydroxides can be used for liberating the ammonium hydroxide. It is also possible to proceed in such a manner that the spent regenerating solution from the anion exchanger is divided into two parts of which only the first part is passed to the ammonium exchanger since the excess of hydroxides will appear only in the second part of the solution. In this case, only so much lime is added to the solution as is required in order to achieve complete driving off of the ammonia.

It has also been found that during the removal of the anions in de-salting the sugar-containing solution, the same is also de-colorized. Thus, after driving off ammonia, a sugar solution is obtained which is either colorless or of lighter color than the original sugar-containing solution and which is de-ionized corresponding to the cation and anion exchange which has been carried out. During subsequent regeneration of the anion exchanger by means of alkali metal hydroxide, only a portion of the coloring materials bound therein are removed, even when in known manner the hydroxide is applied in several portions which had been used already once or twice in the previous operations.

It has now been found that the coloring materials adhering to the anion exchange resin can be removed by interposing from time to time a treatment of the anion exchanger with a sodium chloride solution. The frequency of the sodium chloride treatment depends on the content of coloring material in the original sugar-containing solution. A treatment of the anion exchanger with sodium chloride solution can be carried out prior or after regeneration of the exchanger, preferably prior to regeneration since in this case no additional regeneration is required for the purpose or removing chloride ions.

A similar de-colorizing effect is already known in anion exchangers containing chloride ions, whereby particular is placed on the lack of ions in the solution which is to be de-colorized. In contrast thereto, during ion exchange in the ammonium cycle, the exchanger is charged during de-colorization either with OH ions or with organic ions, and the solution to be de-colorized is a relatively concentrated solution of organic ammonium salts or ammonium hydroxide.

The sodium chloride solution which is used for removal of the coloring material from the anion exchangers can again be used as a source of alkali ions for producing the hydroxide excess in the regeneration of the anion exchanger, and/or can also be used for regeneration of the softener, since the coloring material contained therein will not be bound by the cation exchangers.

Furthermore, it has now been found that the fine grain calcium carbonate precipitate which accrues as a by-product of the causticization, can be advantageously used as filter aid in the conventional purification of the sugar juices with lime. During the lime purification, colloidal materials which are precipitated from the crude juice are filtered off with the help of calcium carbonate formed therein. Surprisingly, good filtration results are also obtained when the fine grain calcium carbonate which is formed during the ion exchange process is admixed to the precipitated colloids containing crude juice. In this manner, it is possible to reduce the total consumption of lime since the lime first is used in the form of milk of lime for the treatment of the regenerating solutions and subsequently as an auxiliary material during the conventional juice purification.

According to the last-described exchange process, the alkali metal ions of the juice are used, as described, for regenerating the anion exchanger. Thus, a waste solution is obtained which consists nearly exclusively of the non-sugar materials removed from the sugar-containing solution. This waste solution can be used by itself or it can also be combined with the so-called "secondary molases." Secondary molasses are the molasses which are obtained from sugar solutions which have previously been de-salted by ion exchange. In this manner all of the non-sugar constituents of the juice are utilized which without employing the ion exchange process according to the present invention would have been contained in the molasses. Thus, valuable constituents of the molasses are available for further use in the same manner in which they would have been available if the sugar-containing solutions would not have been subjected to ion exchange.

If it is desired to have waste solutions which are free of potassium ions, then, the potassium ions may either be removed by ion exchange, or sodium hydroxide is to be used for regeneration of the anion exchanger. In the first case, the potassium ions can be put to further use; in the second case, the regenerating solution coming from the cation exchanger can be worked up to potash.

It has now been found that the foregoing is also applicable to such purification methods for sugar juices in which purification by means of ion exchangers is not carried out in an ammonium cycle but in a so-called acidic cycle, i.e. wherein the cations are exchanged in a hydrogen ion-charge cation exchanger with hydrogen, and the thus-formed acids are bound in an anion exchanger charged with hydroxide ions. Regeneration of the anion exchanger is carried out in many cases with sodium carbonate or sodium hydroxide. However, it is of course also possible to use for this purpose other alkali metal carbonates or alkali metal hydroxides.

According to a further preferred embodiment of the present invention, the regenerating solution is immediately produced by ion exchange whereby the same advantages are obtained as described further above. Thereby, as described above, either sodium chloride or the alkali metal ions contained in the crude sugar-containing solution may be used as starting material. Since in the present case the alkali metal ions are obtained in the acidic regenerating solutions, these solutions have to be first neutralized in known manner.

The thus-regenerated exchangers can be used during treatment of the sugar-containing solutions, for de-hardening and de-salting of the same, in the following manner:

De-hardening or softening represents a reaction between two-valent alkaline-earth metal ions and the mono-valent sodium ion which reaction proceeds better in more diluted solutions. Since the sugar-containing solution which is to be purified, namely the thin juice of the sugar manufacturing process, contains in addition to calcium ions large quantities of alkali metal ions, it is particularly important to maintain the total ion concentration as low as possible in order to achieve as complete as possible a separation between the mono-valent and two-valent cations.

De-salting according to Equations 1 and 2 is carried out between mono-valent ions and, consequently, does not depend within certain limits on the total ion concentration in the solution. In these exchange reactions, the so-called specific viscosity is an important factor, i.e. the viscosity in relation to the quantity of sugar contained in the solution. The specific viscosity is lowest at a sugar concentration of about between 30 and 40%.

Taking the foregoing into consideration, first calcium is removed from the thin juice by replacing calcium ions in an ion exchanger with alkali metal ions. Thereafter, the solution is concentrated for instance in the first two cookers of an evaporator, to a concentration of between about 30 and 40% solids by weight, and the thus-concentrated solution is then passed at a temperature of between about 70 and 95° C. through an alkali metal-ammonium exchanger and finally at a temperature of preferably between 60 and 80° C. through an anion exchanger.

According to this preferred and improved process, the optimum juice concentration for the de-salting of the solution is obtained by an interposed evaporation. In this manner it is possible to manage with minimum pumping and to considerably reduce the quantity of steam required for driving off ammonia, if the solution is to be subsequently further concentrated by evaporation. These conditions are met by the working up of sugar juices.

Since the subsequent regeneration of the two ion exchangers has to be carried out at lower temperatures, it is further proposed according to the present invention to purge or remove the sugar-containing solutions from the exchangers with water of a temperature lower than the temperature of the sugar-containing solutions.

The following examples are given as illustrative only of the process of the present invention, the invention however not being limited to the specific details of the examples.

Example 1

1060 kilos of thin juice, of which the purity is 92.0, hardness 50 mg. CaO/liter, salt contents 43 equivalent weights (equ.)/t., are conducted through a dehardener $R_1$ (2 liters polystyrene-sulfonic acid) and subsequently through 20 liters cation exchanger $R_1'$ (polystyrene sulfonic acid) and 65 liters anion $R_2$ (polystyrene-quaternary-amin). In a distilling column the juice is liberated from the produced ammonium hydroxide, thus obtaining 1065 kilos of desalted thin juice having a purity of 97.3 and salt contents of 2 equ./t.

The regenerating of the exchangers, mentioned before, is done as follows:

The dehardener $R_1$ is regenerated with 700 gr. NaCl in 7 kg. solution. The cation exchanger $R_1'$ is regenerated with 4400 gr. $(NH_4)_2CO_3$ in 22 kg. solution, the anion exchanger $R_2$ with 2200 gr. NaOH in 45 kilos solution. For producing the NaOH, we first of all treat an Na-ions loaded cation exchanger $R_1^x$, the quantity of which amounts to 27 liters, with 5300 gr. $(NH_4)_2CO_3$ in 27 kg. solution, and from the $Na_2CO_3$ solution so obtained, the $(NH_4)_2CO_3$ is driven off by means of steam, and the $Na_2CO_3$ is causticized with 22 kilos CaO. The exchanger $R_1^x$, for its part, is treated with 3800 gr. NaCl in 16 kg. solution, to be transformed into a state loaded with Na-ions. From this solution the ammonia is set at liberty with 1200 gr. CaO.

Example 2

The course of regenerating is most widely identical with that described in Example 1; but in this case, instead of using the 3800 gr. NaCl, we use 43 equivalents of $Na_2CO_3$, obtained in regenerating of anion exchanger and the 22 equivalents of the surplus NaOH still present in the solution for regenerating the cation exchanger $R_1^x$. In order to make sure the necessary surplus in Na-ions for the production of $Na_2CO_3$, we must add also 11 more equivalents NaCl to the above mentioned solution.

Example 3

As a difference from Example 1, we use here, for desalting, 23 liters of cation exchanger $R_1'$. This exchanger is regenerated with 5000 gr. $(NH_4)_2CO_3$ in 25 kg. solution, so producing 43 equivalents of alkali-carbonates, which are liberated from the surplus $(NH_4)_2CO_3$ by boiling. After that, to ensure covering for the necessary caustic surplus, we add another 12 equivalents of $Na_2CO_3$ and the solution is causticized, which is then used for regenerating the anion exchanger $R_2$. The 12 equivalents $Na_2CO_3$ are produced by ion exchange, as is described in Example 1, by applying correspondingly reduced quantities.

Example 4

As a difference from Example 1, here, we use for desalting 27 liters of cations exchanger $R_1'$. For regenerating the same, we take 53 kg. $(NH_4)_2CO_3$ in 27 kilos solution, and so we obtain the necessary quantity of 55 equivalents of alkali carbonate for further processing. Before regenerating, we conduct on the cations exchanger the waste solution obtained in the regenerating of $R_2$, consisting of 43 equivalents of alkali salts. To this solution obtained, we must add 440 gr. of CaO for liberating the ammonia.

Example 5

For liberating the ammonia formed in the solution after conducting through the cations exchanger as per Example 4, 440 gr. of CaO were needed. According to claim 6 we use for that the 12 equivalents alkali metal hydroxide in the waste solution from the regeneration of the anion exchanger and we add only 100 gr. of CaO to make the liberation of ammonia complete.

Example 6

In the treatment of the quantities of juice mentioned in Example 1, we obtain a 75% decolourization of the juice, if we treat the indicated 65 liters of anions exchanger after each second passage of juice with a salt solution which contains 6.5 kg. of NaCl in 65 kg. The salt solution already used once, is introduced once more previous to the fresh solution. The decolourization indicated, was to be maintained by this treatment, also after the 500th cycle.

Example 7

According to claim 10, the quantity of secondary molasses amounts after the treating given in Example 1 to 1.2% on beets, with a purity of 59.6 and a dry substance of 80. In accordance with the quantities of the present examples the quantity of the secondary molasses is 9.5 kilos. The weight of the non-sugar substances, which had been eliminated from the juice, amounts to 8.5 kilos. The solution of the latter, originally amounting to 120 kilos, is evaporated down, under vacuum to 10 kilos, and so we obtain, after mixing with the secondary molasses, 19.5 kilos of a syruplike liquid.

*Example 8*

In usual juice clarification, we add to the raw juice 0.3% CaO on beets in pre-defecation and 1.0% in main defecation. According to claim 11, we now take, instead of the quantity of lime added in main defecation, only 0.6%, and the balance is added as precipitated $CaCO_3$, originating from the causticization. Filterability and also the color of the thin juice remain.

*Example 9*

According to claims 15–17, 1060 kilos of thin juice are dehardened with the aid of 2 liters of cations exchanger (polystyrene sulfonic acid at 90°). Afterwards, the 1061 kilos of juice obtained are evaporated in the first two bodies of the evaporator station down to 37 Bx so that we obtain 386 kg. of medium juice. This is conducted at 80° on a cation exchanger, then cooled down to 60° and at this temperature it is liberated through an anion exchanger (polystyrene-quaternary amin) from the anions. Finally, after driving off the ammonia formed, we obtain 394 kg. of desalted juice. For displacing the juice from the cation exchanger, we use a condensate having a temperature of 70°, for that of the anion exchanger a condensate of 50° temperature.

*Example 10*

According to claim 12, 1060 kg. of thin juice is desalted with 27 liters of cation exchanger (polystyrene sulfonic acid), which is regenerated with hydrochloric acid and with 50 liters of anion exchanger (polystyrene-quaternary amin). The cation exchanger is first liberated with means of $NH_4OH$ from the nitrogen compounds and afterwards treated with 5300 gr. $(NH_4)_2CO_3$ in a 27 kg. solution, so obtaining 42 equivalents of alkali carbonate. This is causticized with 60 equivalents of CaO, and the solution obtained is used for regeneration of the anions exchanger.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of purifying sugar-containing solutions, the steps of subjecting a sugar-containing solution to ion exchange in a cation exchanger in which alkali cations contained in said solution are removed therefrom in exchange for ammonium ions; regenerating said cation exchanger with ammonium carbonate so as to form a solution of an alkali metal carbonate; subjecting the sugar and ammonium ions containing solution formed in said cation exchanger to ion exchange in a strongly basic anion exchanger; causticizing said solution of alkali metal carbonate formed by regeneration of said cation exchanger so as to transform the same into a solution of alkali metal hydroxide; regenerating said strongly basic anion exchanger with the thus-formed solution of alkali metal hydroxide; and blowing off ammonium hydroxide formed in said anion exchanger.

2. A method according to claim 1 in which the solution formed by regenerating said strongly basic anion exchanger is used as starting material for forming said alkali metal carbonate; and in which the alkali metal ions-containing solution formed by regenerating said strongly basic anion exchanger is introduced into said cation exchanger.

3. A method according to claim 1 in which a portion of the alkali metal carbonate formed during regeneration of said cation exchanger is derived from the alkali metal ions contained in said sugar-containing solution.

4. A method according to claim 2 in which said alkali metal ions-containing solution formed by regenerating said strongly basic anion exchanger is passed through said cation exchanger subsequent to the passing therethrough of said sugar-containing solution.

5. In a method of purifying sugar-containing solutions which also contain coloring materials, the steps of subjecting said solution to ion exchange in a cation exchanger in which alkali cations contained in said solution are removed therefrom in exchange for ammonium ions; regenerating said cation exchanger with ammonium carbonate so as to form a solution of an alkali metal carbonate; subjecting the sugar, coloring materials and ammonium ions containing solution formed in said cation exchanger to ion exchange in a strongly basic anion exchanger, thereby removing anions and coloring materials therefrom; causticizing said solution of alkali metal carbonate formed by regeneration of said cation exchanger so as to transform the same into a solution of alkali metal hydroxide; regenerating said strongly basic anion exchanger with the thus-formed solution of alkali metal hydroxide; treating said anion exchanger with a solution of sodium chloride so as to remove therefrom coloring materials retained during passing of said solution through said anion exchanger, regenerating of said anion exchanger and treating of the same with sodium chloride solution being carried out in any desired sequence; and subjecting additional sugar-containing solution to anion exchange in the thus-regenerated anion exchanger.

6. A method according to claim 5 in which said sodium chloride solution after being passed through said anion exchanger is passed as a source of alkali metal ions through said cation exchanger.

7. A method according to claim 4 in which potassium ions-containing non-sugar constituents of said sugar-containing solution which are removed from said solution in said cation exchanger are subjected to ion exchange so as to remove said potassium ions therefrom.

8. A method according to claim 7 in which said sugar-containing solution and secondary molasses are formed during the working up of a sugar-containing vegetablic raw material, and wherein the non-sugar constituents of said sugar-containing solution which are removed therefrom in said ion exchangers are admixed to said secondary molasses.

9. In a method of purifying sugar-containing solutions, the steps of subjecting a sugar-containing solution formed in the working up of a sugar-containing vegetablic raw material, said working up including precipitation with lime of a portion of the non-sugar constituents of said vegetablic raw material, to ion exchange in a cation exchanger in which alkali cations contained in said solution are removed therefrom in exchange for ammonium ions; regenerating said cation exchanger with ammonium carbonate so as to form a solution of an alkali metal carbonate; subjecting the sugar and ammonium ions containing solution formed in said cation exchanger to ion exchange in a strongly basic anion exchanger; causticizing said solution of alkali metal carbonate formed by regeneration of said cation exchanger so as to transform the same into a solution of alkali metal hydroxide and into a residual sludge; employing said sludge as filter aid in the lime precipitation of said portion of said non-sugar constituents; regenerating said strongly basic anion exchanger with the thus-formed solution of alkali metal hydroxide; and subjecting additional sugar-containing solution to anion exchange in the thus-regenerated anion exchanger.

10. In a method of purifying sugar-containing solutions, the steps of subjecting a sugar-containing solution to ion exchange in a cation exchanger in which alkali cations contained in said solution are removed therefrom in exchange for hydrogen ions; first regenerating said cation exchanger with ammonium carbonate so as to form a solution of an alkali metal carbonate; thereafter regenerating said cation exchanger with acid, subjecting the sugar and hydrogen ions containing solution formed in said cation exchanger to ion exchange in an ion exchanger; causticizing said solution of alkali metal carbonate formed by said first regeneration of said cation exchanger so as to transform the same into a solution of alkali metal hydroxide; and regenerating said anion exchanger with the thus-formed solution of alkali metal hydroxide.

11. In a method of purifying sugar-containing solutions, the steps of subjecting a partially evaporated solution obtained in the working up of a sugar-containing vegetable raw material and having a viscosity which is low relative to the sugar content of said partially evaporated solution to ion exchange in a cation exchanger in which alkali cations contained in said solution are removed therefrom in exchange for ammonium ions; regenerating said cation exchanger with ammonium carbonate so as to form a solution of an alkali metal carbonate; subjecting the sugar and ammonium ions containing solution formed in said cation exchanger to ion exchange in a strongly basic anion exchanger; causticizing said solution of alkali metal carbonate formed by regeneration of said cation exchanger so as to transform the same into a solution of alkali metal hydroxide; regenerating said strongly basic anion exchanger with the thus-formed solution of alkali metal hydroxide; and subjecting additional sugar-containing solution to anion exchange in the thus-regenerated anion exchanger.

12. A method according to claim 11 in which the alkali ion exchange is carried out at a temperature of approximately between 70 and 90° C., the anion exchange is carried out at a temperature of approximately between 60° and 80° C. and the sugar-containing solutions are purged from said ion exchangers with water having a temperature lower than the temperature of said sugar-containing solutions.

References Cited in the file of this patent

UNITED STATES PATENTS

| | | |
|---|---|---|
| 2,551,519 | Winters | May 1, 1951 |
| 2,560,504 | Day | July 10, 1951 |
| 2,678,288 | Cotton et al. | May 11, 1954 |
| 2,785,998 | Harding | Mar. 19, 1957 |